United States Patent
Rakhunde et al.

(10) Patent No.: US 12,435,593 B2
(45) Date of Patent: Oct. 7, 2025

(54) COMMUNICATION NETWORKS FOR BOP CONTROL

(71) Applicant: Schlumberger Technology Corporation, Sugar Land, TX (US)

(72) Inventors: Vikas Rakhunde, Cypress, TX (US); Dinesh Kumar Dhamodaran, Florence, KY (US); Limin Chen, Cypress, TX (US); Nick Krippner, Houston, TX (US); Dhinesh Prabhu Nataraja Prabu, Coimbatore (IN); Matthew Olson, Cypress, TX (US)

(73) Assignee: Schlumberger Technology Corporation

(*) Notice: Subject to any disclaimer, the term of this patent is extended or adjusted under 35 U.S.C. 154(b) by 0 days.

(21) Appl. No.: 18/687,359

(22) PCT Filed: Sep. 8, 2022

(86) PCT No.: PCT/US2022/042889
§ 371 (c)(1),
(2) Date: Feb. 28, 2024

(87) PCT Pub. No.: WO2023/039052
PCT Pub. Date: Mar. 16, 2023

(65) Prior Publication Data
US 2025/0122775 A1 Apr. 17, 2025

Related U.S. Application Data

(60) Provisional application No. 63/241,553, filed on Sep. 8, 2021.

(51) Int. Cl.
*E21B 33/035* (2006.01)
*E21B 33/064* (2006.01)

(52) U.S. Cl.
CPC ........ *E21B 33/0355* (2013.01); *E21B 33/064* (2013.01)

(58) Field of Classification Search
CPC .......................... E21B 33/0355; E21B 33/064
See application file for complete search history.

(56) References Cited

U.S. PATENT DOCUMENTS

| | | |
|---|---|---|
| 7,261,162 B2 | 8/2007 | Deans |
| 7,576,447 B2 | 8/2009 | Biester |

(Continued)

FOREIGN PATENT DOCUMENTS

| | | |
|---|---|---|
| EP | 2917460 A1 | 9/2015 |
| WO | 2014035975 A1 | 3/2014 |
| WO | 2020251821 A1 | 12/2020 |

OTHER PUBLICATIONS

International Search Report and Written Opinion issued in International Patent application PCT/US2022/042889 on Jan. 4, 2023, 10 pages.

(Continued)

*Primary Examiner* — Matthew R Buck
(74) *Attorney, Agent, or Firm* — Jeffrey D. Frantz

(57) ABSTRACT

An apparatus for controlling a subsea blowout preventor (BOP) includes a control system for controlling a subsea BOP of a subsea stack assembly installed over a subsea oil and gas well. The control system includes a first topside control device and a second topside control device, and a first subsea control device and a second subsea control device. The first topside control device, the second topside control device, the first subsea control device, and the second subsea control device are each communicatively connected with the BOP and operable to control operation of the BOP. The first subsea control device is a portion of a first control pod of the subsea stack assembly. The second subsea control device is a portion of a second control pod of the (Continued)

subsea stack assembly. The first topside control device is communicatively connected with the second topside control device via a ring communication network.

10 Claims, 9 Drawing Sheets

(56) References Cited

U.S. PATENT DOCUMENTS

| | | | |
|---|---|---|---|
| 8,149,133 B2 | 4/2012 | Milne | |
| 8,159,365 B2 | 4/2012 | Milne | |
| 8,212,378 B2 | 7/2012 | Biester | |
| 9,322,264 B2 | 4/2016 | Gutierrez | |
| 9,970,287 B2 | 5/2018 | Jaffrey | |
| 10,000,987 B2 | 6/2018 | Springett | |
| 10,018,007 B2 | 7/2018 | Panicker-Shah | |
| 10,202,839 B2* | 2/2019 | Scott | E21B 33/064 |
| 10,338,578 B2 | 7/2019 | Thwaites | |
| 10,539,010 B2 | 1/2020 | Gutierrez | |
| 10,787,877 B2 | 9/2020 | Pedersen | |
| 10,788,543 B2 | 9/2020 | Emerich | |
| 11,136,857 B2 | 10/2021 | Cramm | |
| 11,180,967 B2 | 11/2021 | Pedersen | |
| 11,221,618 B2 | 1/2022 | Thwaites | |
| 2013/0050480 A1 | 2/2013 | Ebenezer | |
| 2015/0094866 A1 | 4/2015 | Pereira | |
| 2016/0090808 A1* | 3/2016 | Karvonen | E21B 47/12 700/275 |
| 2016/0090810 A1* | 3/2016 | Holmes | E21B 33/064 700/282 |
| 2019/0360295 A1 | 11/2019 | Mantri | |
| 2020/0116017 A1 | 4/2020 | Deville | |
| 2020/0190931 A1* | 6/2020 | Moen | E21B 41/0007 |
| 2020/0332653 A1 | 10/2020 | Gutierrez | |
| 2020/0408058 A1* | 12/2020 | Pedersen | E21B 33/0355 |
| 2022/0282587 A1 | 9/2022 | Ducamin | |
| 2024/0003214 A1 | 1/2024 | Dhamodaran | |

OTHER PUBLICATIONS

"Ring Network article downloaded from Wikipeida, 2021: https://en.wikipedia.org/wiki/Ring_network".

* cited by examiner

COMMUNICATION NETWORKS FOR BOP CONTROL

CROSS-REFERENCE TO RELATED APPLICATION

This application claims priority to International Application No. PCT/US2022/042889, entitled "Communication Networks for BOP Control," filed Sep. 8, 2022, which claims priority to and the benefit of U.S. Application No. 63/241,553, entitled "Communication Networks for BOP Control," filed Sep. 8, 2021, the disclosures of which are hereby incorporated by reference in their entirety.

BACKGROUND OF THE DISCLOSURE

Wells extend into land surface or sea floor to facilitate recovery of natural deposits of oil, gas, and other minerals that are trapped in subterranean geological formations. A well construction system (e.g., a drilling rig) having various surface, subsea, and/or subterranean well construction equipment operating in a coordinated manner may drill a wellbore through a subterranean formation. For example, a top drive and/or other drive mechanism(s) can be utilized to rotate and advance a drill string into the subterranean formation to drill the wellbore. The drill string may include a plurality of drill pipes coupled together and terminating with a drill bit. The length of the drill string is increased by adding additional drill pipes as the depth of the wellbore increases. Drilling fluid may be pumped from land or sea surface down through the drill string to the drill bit. The drilling fluid lubricates and cools the drill bit and carries drill cuttings from the wellbore back to the land or sea surface. The drilling fluid returning to the land or sea surface may then be cleaned and again pumped through the drill string. After the well is complete, a mineral extraction system (e.g., a land-based or subsea production tree) having various mineral extraction equipment operating in a coordinated manner may extract (i.e., produce) minerals (e.g., oil and/or gas) from the subterranean formation via the wellbore.

An offshore well construction and mineral extraction system located topside (i.e., at a sea surface) may comprise an offshore rig and a riser extending between the offshore rig and a subsea stack assembly connected to a subsea wellhead installed over a wellbore. During drilling operations, a drill string may be deployed into the wellbore through the riser, the stack assembly, and the wellhead. During mineral extraction operations, the minerals may be extracted from the wellbore through the stack assembly and the wellhead.

A stack assembly comprises a plurality of blowout preventers (BOPs) operable to seal and control wellbore fluid during drilling and extraction operations. In the event of a rapid invasion of formation fluid into the wellbore, known as a "kick," the BOPs of the stack assembly may be actuated to seal the wellbore (e.g., an annulus between the drill string and a casing lining the wellbore) and, thus, control fluid pressure in the wellbore to protect equipment located above the BOPs. The stack assembly also comprises control pods (i.e., a "yellow" control pod and a "blue" control pod) for controlling delivery of control fluid to the BOPs to control operation of the BOPs. Each control pod may comprise a subsea controller and/or may be communicatively connected with a corresponding topside controller located on the offshore rig via one or more communication networks extending between the topside controller and the control pod to facilitate monitoring and control of the BOPs from the offshore rig. However, current communication networks extending between the topside controller and the control pods are susceptible to communication interruptions and are thus unreliable.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
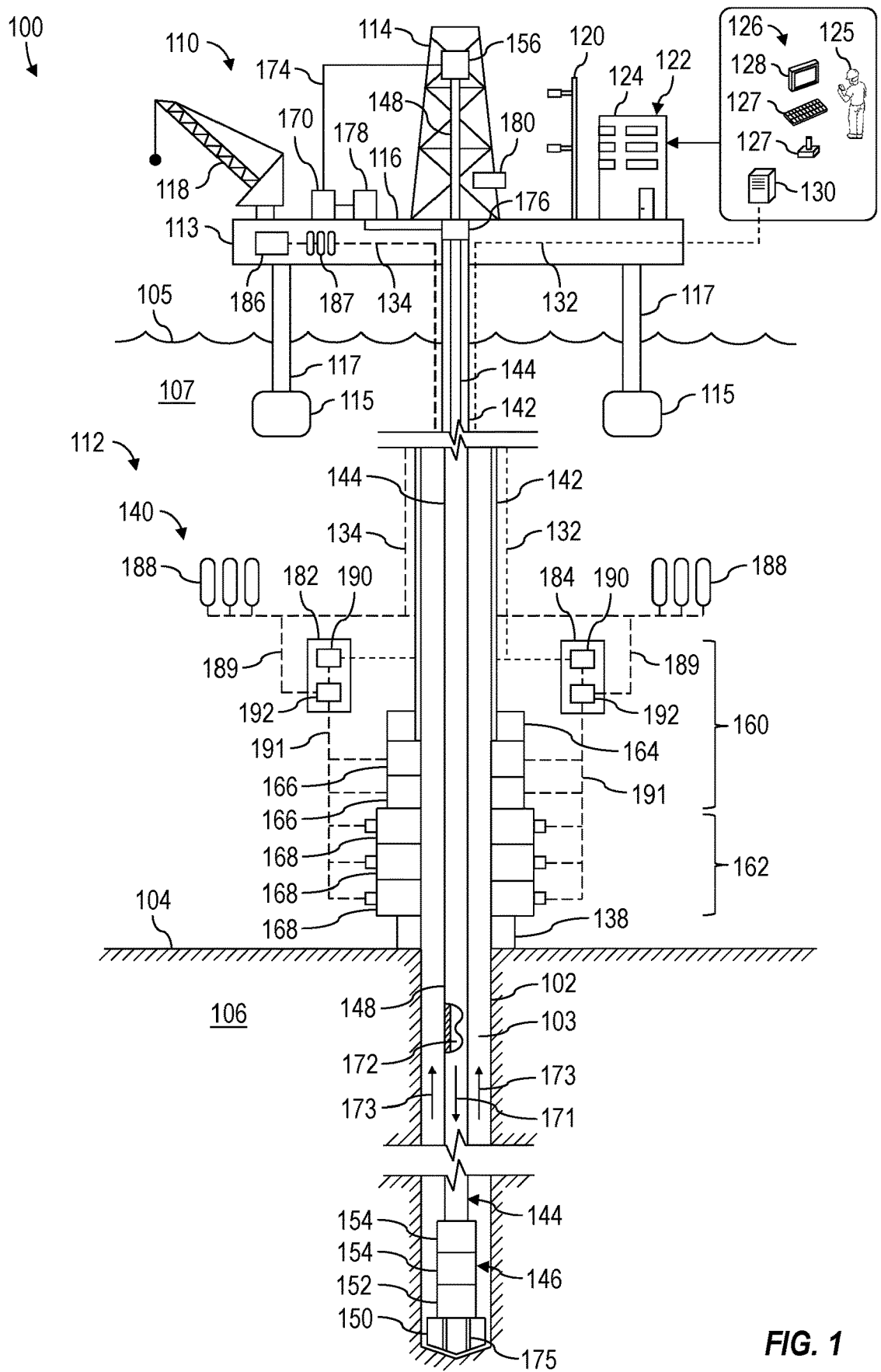
FIG. 1 is a schematic view of at least a portion of an example implementation of apparatus according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

FIG. 1 is a schematic view of at least a portion of an example implementation of an offshore well construction and mineral extraction system 100 (hereinafter an "offshore system") according to one or more aspects of the present disclosure. The offshore system 100 comprises well construction equipment collectively operable to construct a well, including drilling a wellbore 102 extending into a subterranean formation 106 below a floor 104 (hereinafter a "sea floor") of a body of water 107 (e.g., a lake, a sea, an ocean, etc.) at which the offshore system 100 is located, and then extract hydrocarbons (e.g., oil and/or gas) from the subterranean formation 106 via the wellbore 102. The offshore system 100 represents an example environment in which one or more aspects of the present disclosure described below may be implemented.

The offshore system 100 comprises topside well construction and hydrocarbon extraction equipment located above a surface 105 (hereinafter a "sea surface") of the body of water 107 and subsea well construction and hydrocarbon extraction equipment located below the sea surface 105. For example, the offshore system 100 comprises an offshore drilling and mineral extraction rig 110 (hereinafter an "offshore rig") and associated subsea equipment 112 located at the sea floor 104 or otherwise below the sea surface 105. The offshore rig 110 may be or comprise a floating platform having a main structure 113 (i.e., a hull) supported above the sea surface 105 by buoyant members 115 (e.g., pontoons) connected to the main structure 113 by corresponding legs 117. However, it is to be understood that the offshore rig 110 may instead be implemented as or otherwise be supported on the sea surface 105 by a sea vessel and/or other means. The offshore rig 110 may further comprise a mast, a derrick, and/or other support structure 114 installed on or otherwise located over a rig floor 116 (i.e., a drill floor). The offshore rig 110 may comprise various object handling equipment, such as cranes 118 and handling equipment 120 (e.g., manipulators, movers, etc.) operable to move tubulars (e.g., drill pipes) and other objects (e.g., submersible devices) during well construction and mineral extraction operations.

The offshore rig 110 may comprise a control center 122 from which various equipment or portions of the offshore system 100 may be monitored and controlled. The control center 122 may comprise a facility 124 (e.g., a room, a cabin, etc.) containing one or more control workstations 126, each of which may be operated by rig personnel 125 (e.g., a driller or other human rig operator) to monitor and control the various equipment or portions of the offshore system 100. The control center 122 may be located on or otherwise in association with the rig floor 116. One or more of the control workstations 126 may be located outside of the control center 122 and/or the facility 124.

The offshore rig 110 may further comprise a central controller 130 (e.g., a processing device, a computer, a programmable logic controller (PLC), etc.) operable to receive, process, and output information to monitor operations of and provide control to one or more portions of the offshore system 100. The central controller 130 may be communicatively connected with the various equipment of the offshore rig 110 and the subsea equipment 112 described herein, and may be operable to receive sensor data (e.g., sensor signals) from and transmit control data (e.g., control signals or commands) to such equipment to perform various operations described herein. The central controller 130 may store executable computer program code, instructions, and/or operational parameters or set-points, including for implementing one or more aspects of methods and operations described herein. The central controller 130 may be located within and/or outside of the facility 124. Although it is possible that the entirety of the central controller 130 is implemented within one device, it is also contemplated that one or more components or functions of the central controller 130 may be implemented across multiple devices, some or an entirety of which may be implemented as part of the control center 122 and/or located within the facility 124.

One or more of the control workstations 126 may be communicatively connected with the central controller 130. Hence, one or more of the control workstations 126 may be operable for entering or otherwise communicating control data to the central controller 130 (and local controllers) by the rig personnel 125, and for displaying or otherwise communicating sensor data and other information from the central controller 130 to the rig personnel 125. Each control workstation 126 may be or comprise a human-machine interface (HMI), which may include one or more input devices 127 (e.g., a keyboard, a mouse, a joystick, a touchscreen, etc.) and one or more output devices 128 (e.g., a video monitor, a touchscreen, a printer, audio speakers, etc.). Communication between the central controller 130, the input and output devices 127, 128, and the various equipment of the offshore rig 110 may be performed via wired and/or wireless communication means. However, for clarity and ease of understanding, such communication means are not depicted, and a person having ordinary skill in the art will appreciate that such communication means are within the scope of the present disclosure. Communication between the central controller 130 and the various subsea equipment 112 may be performed via wired and/or wireless communication means. For example, communication between the central controller 130 and the various subsea equipment 112 may be performed via one or more communication lines 132 extending between the central controller 130 and the various subsea equipment 112. The communication lines 132 may be implemented by one or more multiplexer (MUX) cables comprising one or more electrical communication conductors, fiber optic communication conductors, and electrical power conductors.

The subsea equipment 112 may comprise a wellhead 138 mounted over the wellbore 102 and a stack assembly 140 mounted on the wellhead 138. The offshore system 100 may further comprise a tubular drilling riser 142 extending between the rig floor 116 and the stack assembly 140. The riser 142 creates an artificial "wellbore" that permits equipment and fluid to be conveyed between the offshore rig 110 and the wellbore 102. The riser 142 may comprise a plurality of riser tubulars (i.e., riser pipe segments) that are coupled together in series until a predetermined length of the riser 142 is achieved. The offshore system 100 may also comprise a drill string 144 configured to drill the wellbore 102. The drill string 144 may be assembled at the offshore rig 110 and suspended from the support structure 114 within the riser 142, the stack assembly 140, and the wellbore 102. When deployed within the wellbore 102, the drill string 144 defines an annulus 103 (i.e., an annular space) extending axially between the offshore rig 110 and the drill bit 150 and radially between an outer surface of the drill string 144 and inner surfaces (i.e., sidewalls) of the wellbore 102, the stack assembly 140, and the riser 142.

The drill string 144 may comprise a bottomhole assembly (BHA) 146 and means 148 for conveying the BHA 146 within the wellbore 102. The conveyance means 148 may comprise a plurality of interconnected tubulars, such as drill pipe, heavy-weight drill pipe (HWDP), wired drill pipe (WDP), tough logging condition (TLC) pipe, and drill collars, among other examples. The conveyance means 148 may instead comprise coiled tubing for conveying the BHA 146 within the wellbore 102. A downhole end of the BHA 146 may include or be coupled to a drill bit 150. Rotation of the drill bit 150 and the weight of the drill string 144 collectively operate to form the wellbore 102. The drill bit 150 may be rotated from the offshore rig 110 and/or via a downhole mud motor 152 connected with the drill bit 150. The BHA 146 may also include various downhole devices and/or tools 154.

The support structure 114 may support a driver, such as a top drive 156, operable to connect with an upper end of the drill string 144 and/or otherwise impart rotary motion and vertical motion to the drill string 144, including the drill bit 150. However, other drivers, such as a kelly and rotary table (neither shown), may be utilized instead of or in addition to the top drive 156 to impart the rotary motion to the drill string 144. The top drive 156 and the connected drill string 144 may be suspended from the support structure 114 via a hoisting system (not shown) operable to selectively lift and lower the top drive 156 to thereby selectively lift and lower the drill string 144. Hence, during drilling operations, the top drive 156, in conjunction with operation of the hoisting system, may advance the drill string 144 downward within the wellbore 102 into the formation 106 to form the wellbore 102.

The stack assembly 140 may comprise a lower marine riser package (LMRP) 160 and a lower BOP stack 162. The LMRP 160 may comprise a flex joint 164 configured to connect the riser 142 to the stack assembly 140. The LMRP 160 may be operable to release the riser 142, thereby permitting the offshore rig 110 to move away from the stack assembly 140 and the wellbore 102. The LMRP 160 may further comprise annular preventers 166 each having an annular elastomeric sealing member (not shown) that is mechanically squeezed radially inward (e.g., via hydraulic pressure) to seal about the drill string 144 and therefore block flow of wellbore fluid (e.g., formation fluid and/or drilling fluid) through the annulus 103 around the drill string 144. The lower BOP stack 162 may comprise a plurality of ram BOPs 168 each having a pair of opposed rams and a pair of hydraulic and/or other actuators (neither shown) configured to actuate and drive corresponding rams. One or more pairs of rams may be shear rams configured to cut through the drill string 144 before sealing off the wellbore 102, one or more pairs of the rams may be pipe rams configured to seal against an outer surface of the drill string 144, or one or more pairs of the rams may be blind rams configured to seal against each other when the drill string 144 or other downhole tools are not disposed within the wellbore 102 or otherwise extend through the stack assembly 140. The annular preventers 166 and the ram BOPs 168 may collectively control well pressure by sealing the wellbore fluid within the wellbore 102.

The offshore system 100 may further comprise drilling fluid circulation equipment 170 operable to circulate drilling fluid between equipment of the offshore rig 110 and the drill bit 150 during drilling operations. For example, the drilling fluid circulation equipment 170 may be operable to circulate the drilling fluid downhole within the wellbore 102 via an internal fluid passage 172 extending longitudinally through the drill string 144 to the drill bit 150. The drilling fluid circulation equipment 170 may comprise a fluid container holding the drilling fluid (i.e., drilling mud) and one or more pump units (i.e., mud pumps) (neither shown) operable to move the drilling fluid from the container into and through the drill string 144. The drilling fluid may be injected into the fluid passage 172 at an upper end of the drill string 144 via a fluid conduit (i.e., a standpipe) 174 extending from the pump units to the top drive 156 and an internal passage extending through the top drive 156.

During drilling operations, the drilling fluid may continue to flow downhole through the internal fluid passage 172 of the drill string 144, as indicated by directional arrow 171. The drilling fluid may exit the BHA 146 via ports 175 in the drill bit 150 and then circulate uphole through the annulus 103 of the wellbore 102, the stack assembly 140, and the riser 142 as indicated by directional arrow 173. In this manner, the drilling fluid lubricates the drill bit 150 and carries formation cuttings uphole to the offshore rig 110. The returning drilling fluid may exit the annulus 103 via fluid control equipment 176 located above the riser 142. The fluid control equipment 176 may be or comprise, for example, a bell nipple or a ported adapter (e.g., a spool, cross adapter, a wing valve, etc.).

Before being returned to the drilling fluid circulation equipment 170, the drilling fluid returning to the offshore rig 110 may be cleaned and/or reconditioned via drilling fluid cleaning and reconditioning equipment 178, which may include one or more of liquid-gas (i.e., mud-gas) separators, shale shakers, and other drilling fluid cleaning and reconditioning equipment (none shown). The liquid-gas separators may remove formation gases and formation fluids entrained in the drilling fluid discharged from the wellbore 102 and the shale shakers may separate and remove solid particles (e.g., drill cuttings) from the drilling fluid. The cleaned and reconditioned drilling fluid may be transferred to the drilling fluid circulation equipment 170, the solid particles removed from the drilling fluid may be transferred to a solids container or discarded into the body of water 107, and the removed formation fluid and/or gas may be transferred to a burning device (e.g., a flare stack or an oil burner) to be burned.

The offshore rig 110 may further comprise tubular handling equipment operable to store, move, connect, and disconnect tubulars (e.g., drill pipes, drill collars, drill pipe stands, casing joints/stands, riser joints/stands, etc.), such as to assemble and disassemble the drill string 144 during drilling and running operations. The tubular handling equipment may comprise the cranes 118 and/or the handling equipment 120 disposed in association with a tubular rack (not shown) for storing the tubulars. The tubular handling equipment may further comprise one or more iron roughnecks 180 located at the rig floor 116. The tubular handling equipment may be collectively operable to transfer the tubulars between the tubular rack and the drill string 144 (i.e., a space above the suspended drill string 144) and to make up and break out connections of the drill string 144 to assemble and disassemble the drill string, as well as similar operations for casing and/or riser construction operations.

The offshore rig 110 may further comprise power fluid equipment 186 operable to supply pressurized control fluid (e.g., a hydraulic fluid) to the stack assembly 140 to power (i.e., actuate) various components of the stack assembly 140, including the annular preventers 166 and the ram BOPs 168. The power fluid may be transferred subsea to the stack assembly 140 and returned topside to the offshore rig 110 via one or more fluid conduits 134 extending along the riser 142. The power fluid equipment 186 may comprise a hydraulic power unit having a fluid container and a pump actuated by electric motors. The hydraulic power unit may be operable to pressurize the control fluid and discharge the pressurized control fluid to the stack assembly 140 via the fluid conduits 134. The power fluid equipment 186 may further comprise a power fluid mixing unit for mixing (i.e., producing) the power fluid, such as based on depth, temperature, and/or operational specifications of the stack assembly 140. The power fluid mixing unit may comprise a plurality of fluid containers storing components of the power fluid and one or more flow control valves operable to mix such components. The power fluid equipment 186 may also comprise a power fluid return unit operable to clean, recondition, and/or dispose of the power fluid returning topside from the stack assembly 140. The pressurized control fluid may be stored topside in one or more topside accumulators 187. The control fluid may also or instead be stored in one or more subsea accumulators 188 located on the stack assembly 140. Each set of accumulators 187, 188 may be operable to store a predetermined volume of the pressurized control fluid.

The LMRP 160 or other portion of the stack assembly 140 may comprise a first control pod 182 (e.g., a "yellow" control pod) and a second control pod 184 (e.g., a "blue" control pod). Each control pod 182, 184 may be operable to control various components of the stack assembly 140. Each control pod 182, 184 may be fluidly connected with the subsea accumulators 188 via corresponding fluid conduits 189. Each control pod 182, 184 may be fluidly connected with the topside accumulators 187 via the fluid conduits 134 and the corresponding fluid conduits 189. Each control pod 182, 184 may be fluidly connected with each of the annular preventers 166 and the ram BOPs 168 via corresponding fluid conduits 191. Each control pod 182, 184 may control delivery of the control fluid to and from one or more of the annular preventers 166 and the ram BOPs 168 to thereby fluidly actuate, drive, operate, or otherwise control one or more of the annular preventers 166 and the ram BOPs 168.

Each control pod 182, 184 may comprise a local controller 190 communicatively connected to various fluid control valves 192, such as to facilitate control of the control fluid and, thus, facilitate control of the annular preventers 166 and the ram BOPs 168. For example, when an intended operation (e.g., closing a ram BOP 168) is to be performed, a controller 190 of one of the control pods 182, 184 may output control data (i.e., control signals or commands) to a corresponding fluid control valve 192 associated with that operation to cause the fluid control valve 192 to open and, thus, supply control fluid to a component (e.g., a piston of a ram BOP 168) responsible for carrying out the operation. Each controller 190 may automatically generate or otherwise output control data to the various components of the stack assembly 140, such as based on computer program code (i.e., programming) stored on the controller 190 and/or based on environmental and/or operational parameters (i.e., conditions) detected within the wellbore 102 and/or in association with the stack assembly 140. Each controller 190 may be communicatively connected with the central controller 130 via the communication lines 132 extending between the offshore rig 110 and each control pod 182, 184. Each controller 190 may also or instead automatically generate or otherwise output control signals to the various components of the stack assembly 140 based on control data received from the central controller 130. The central controller 130 may thus automatically control the various components of the stack assembly 140 via the controllers 190 based on computer program code stored on the central controller 130. Each controller 190 may also or instead generate or otherwise output control signals to the various components of the stack assembly 140 based on control data received from the central controller 130 that was manually entered by the rig personnel 125 via one or more of the control workstations 126.

Systems within the scope of the present disclosure may include more or fewer components than as described above and depicted in FIG. 1. Additionally, various equipment and/or subsystems of the offshore system 100 shown in FIG. 1 may include more or fewer components than as described above and depicted in FIG. 1. For example, various engines, electric motors, hydraulics, actuators, valves, and/or other components not explicitly described herein may be included in the offshore system 100, and are within the scope of the present disclosure.

The present disclosure is further directed to systems and methods for controlling one or more well construction equipment components of an offshore system via a control system comprising a plurality of controllers (i.e., electronic control devices) communicatively connected with a plurality of sensors and actuators (e.g., combustion, hydraulic, and/or electrical) disposed in association with the well construction equipment. The actuators may cause corresponding equipment to perform intended actions (e.g., work, tasks, movements, operations, etc.). Each sensor may be communicatively connected with a corresponding controller and may be operable to generate sensor data (e.g., electrical sensor signals or measurements, feedback signals, feedback loop, etc.) indicative of an operational (e.g., mechanical, physical, etc.) status of the corresponding piece of equipment or actuator of that piece of equipment, thereby permitting the operational status of the piece of equipment to be monitored by that controller. The sensor data may be utilized by the controller as feedback data, permitting operational control of the piece of equipment and coordination with other pieces of equipment.

Figure 2:
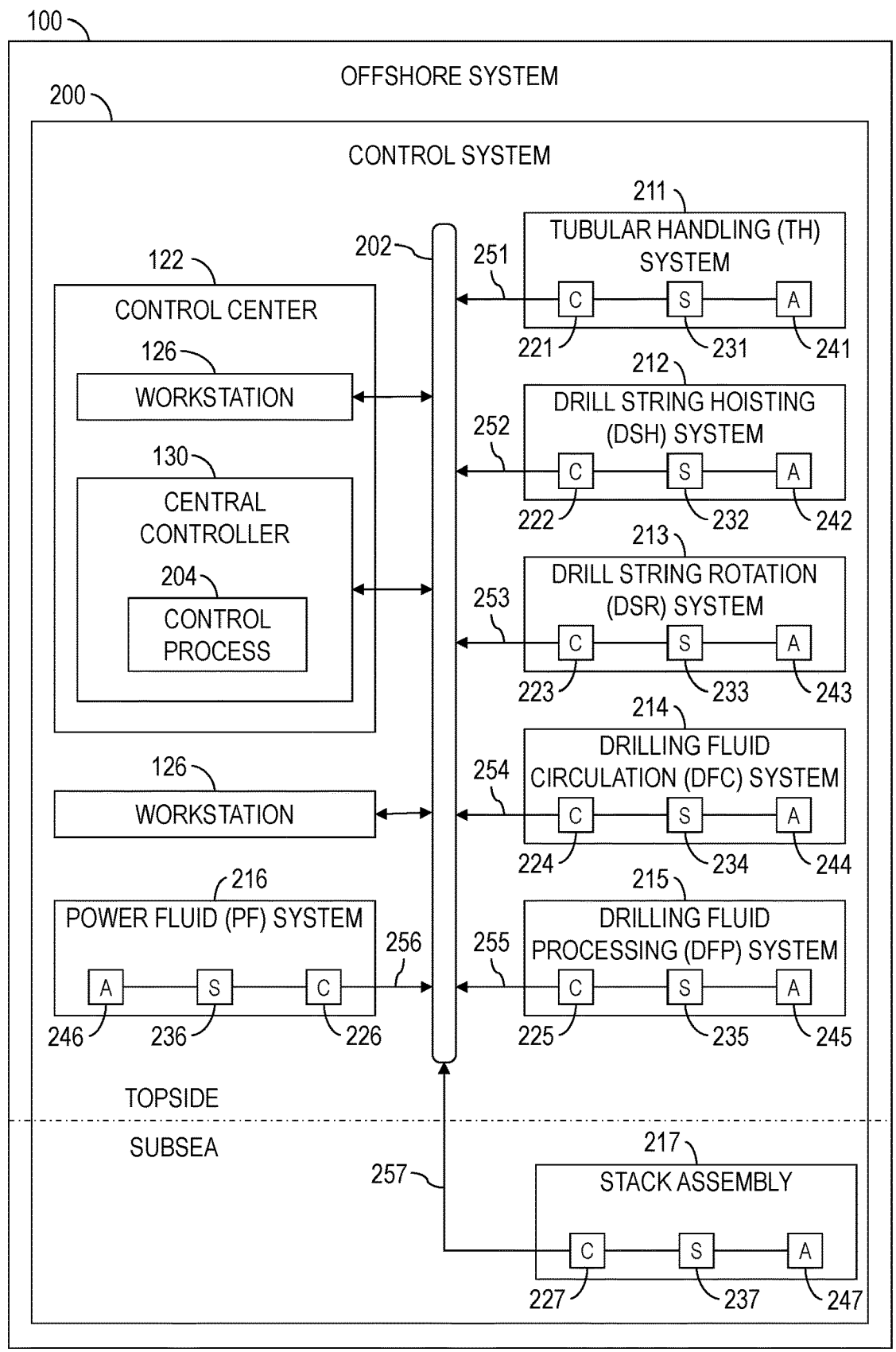
FIG. 2 is a schematic view of at least a portion of an example implementation of apparatus according to one or more aspects of the present disclosure.

FIG. 2 is a schematic view of at least a portion of an example implementation of a control system 200 for monitoring and controlling various equipment and/or systems of equipment of the offshore system 100 shown in FIG. 1. The control system 200 may comprise one or more features of the offshore system 100, including where indicated by like reference numerals. Accordingly, the following description refers to FIGS. 1 and 2, collectively.

The control system 200 may be in real-time communication with and utilized to monitor and/or control various equipment of the offshore system 100 described herein. The equipment of the offshore system 100 may be grouped into several subsystems, each operable to perform a corresponding operation and/or a portion of the well construction operations described herein. The subsystems may include a tubular handling (TH) system 211, a drill string hoisting system (DSH) system 212, a drill string rotation system (DSR) system 213, a drilling fluid circulation (DFC) system 214, a drilling fluid processing (DFP) system 215, a power fluid (PF) system 216, and a stack assembly 217. The TH system 211, the DSH system 212, the DSR system 213, the DFC system 214, the DFP system 215, and the PF system 216 may be located on the offshore rig 110 (i.e., topside) and the stack assembly 217 may be located below the sea surface 105 (i.e., subsea).

The TH system 211 may include the support structure 114, the cranes 118, the handling equipment 120, the tubular rack, slips for selectively locking the drill string 144, the power tongs 180, and/or other tubular handling equipment. The TH system 211 may perform tubular handling operations and serve as a support platform for tubular rotation equipment and a staging ground for rig operations, such as connection make up and break out operations.

The DSH system 212 may comprise, for example, a drawworks for hoisting the top drive 156 and the drill string 144 connected to the top drive 156. The DSH system 212 may perform drill string hoisting operations.

The DSR system 213 may comprise, for example, the top drive 156 and/or the rotary table and kelly. The DSR system 213 may perform drill string rotation operations.

The DFC system 214 may comprise, for example, the drilling fluid circulation equipment 170, the fluid control equipment 176, and other drilling fluid circulation equipment. The DFC system 214 may be operable to pump and circulate the drilling fluid downhole through the drill string 144 and uphole through the annulus 103 of the wellbore 102 and the riser 142.

The DFP system 215 may comprise, for example, the drilling fluid cleaning and reconditioning equipment 178, an oil burner, and/or a gas flare stack. Accordingly, the DFP system 215 may perform drilling fluid cleaning, reconditioning, and mixing operations.

The PF system 216 may comprise, for example, the power fluid equipment 186 and the topside accumulators 187. The PF system 216 may supply pressurized power fluid to the stack assembly 217. The stack assembly 217 may be or comprise the stack assembly 140.

Each of the equipment subsystems 211-217 may further comprise various communication devices (e.g., modems, network interface cards, etc.) and communication lines (e.g., cables, conductors, etc.), communicatively connecting the sensors and actuators of each subsystem 211-217 with a central controller 130 and control workstations 126. Although the equipment listed above and shown in FIG. 1 is associated with certain subsystems 211-217 depicted in FIG. 2, such associations are merely examples that are not intended to limit or prevent such equipment from being associated with two or more subsystems 211-217 and/or different subsystems 211-217.

The control system 200 may include various local controllers 221-227 (i.e., electronic control devices) each operable to control various equipment of the corresponding subsystem 211-217 and/or an individual piece of equipment of the corresponding subsystem 211-217. As described above, each equipment subsystem 211-217 includes various equipment comprising corresponding actuators 241-247 for performing operations of the offshore system 100. Each subsystem 211-217 may include various sensors 231-237 operable to generate or otherwise output sensor data (e.g., signals, information, measurements, etc.) indicative of operational status of the equipment of each subsystem 211-217 and/or indicative of environmental conditions associated with the equipment of each subsystem 211-217. Each local controller 221-227 may output control data (e.g., commands, signals, information, etc.) to one or more actuators 241-247 to perform corresponding actions of a piece of equipment or subsystem 211-217. Each local controller 221-227 may receive sensor data output by one or more sensors 231-237. Although the local controllers 221-227, the sensors 231-237, and the actuators 241-247 are each shown as a single block, it is to be understood that one or more of the local controllers 221-227, the sensors 231-237, and/or the actuators 241-247 may be or comprise a plurality of local controllers, sensors, and/or actuators, respectively.

As described above, the stack assembly 217 may be or comprise the stack assembly 140. Thus, the local controller 227 of the stack assembly 217 may be or comprise the controllers 190 of the stack assembly 140 and the actuator 247 of the stack assembly 217 may be or comprise the fluid control valves 192 of the stack assembly 140.

The sensors 231-237 may include sensors utilized for operation of the various subsystems 211-217 of the offshore system 100. For example, the sensors 231-237 may include cameras, position sensors, speed sensors, acceleration sensors, pressure sensors, force sensors, temperature sensors, flow rate sensors, vibration sensors, electrical current sensors, electrical voltage sensors, resistance sensors, gesture detection sensors or devices, voice actuated or recognition devices or sensors, chemical sensors, exhaust sensors, and/or other examples. The sensor data may include signals, information, and/or measurements indicative of equipment operational status (e.g., on or off, percent load, up or down, set or released, etc.), drilling parameters (e.g., depth, hook load, torque, etc.), auxiliary parameters (e.g., vibration data of a pump), flow rate, temperature, operational speed, position, and pressure, among other examples. The acquired sensor data may include or be associated with a timestamp (e.g., date and/or time) indicative of when the sensor data was acquired. The sensor data may also or instead be aligned with a depth or other drilling parameter.

The central controller 130, the control workstations 126, the local controllers 221-227, the sensors 231-237, and the actuators 241-247 may be communicatively connected. The central controller 130 and the control workstations 126 may be communicatively connected to or along a central communication network 202 (e.g., a data bus, a field bus, a wide-area-network (WAN), a LAN, etc.). The local controllers 221-227, the sensors 231-237, and the actuators 241-247 of the corresponding subsystems 211-217 may be communicatively connected to or along a corresponding local communication network 251-257 (e.g., field buses, local-area-networks (LANs), etc.). Each local communication network 251-257 may be communicatively connected with the central communication network 202 to communicatively connect the central controller 130 with the subsystems 211-217. At least a portion of the central communication network 202 and/or the local communication network 257 may be implemented by the communication lines 132.

The sensor data output by the sensors 231-237 of the subsystems 211-217 may be made available for use by the central controller 130 and/or the local controllers 221-227. Similarly, control data output by the central controller 130 and/or the local controllers 221-227 may be automatically communicated to the various actuators 241-247 of the subsystems 211-217, perhaps pursuant to predetermined programming, such as to facilitate well construction operations and/or other operations described herein. Although the central controller 130 is shown as a single device (i.e., a discrete hardware component), it is to be understood that the central controller 130 may be or comprise a plurality of controllers and/or other electronic control devices collectively operable to monitor and control operations (i.e., computational processes or methods) of the offshore system 100. The central controller 130 may be located within or form a portion of the control center 122, although a portion of the central controller 130 may instead be external to the control center 122.

The sensors 231-237 and the actuators 241-247 may be monitored and/or controlled by corresponding local controllers 221-227 and/or the central controller 130. For example, the central controller 130 may be operable to receive sensor data from the sensors 231-237 of the subsystems 211-217 in real-time, and to output real-time control data directly to the actuators 241-247 of the subsystems 211-217 based on the received sensor data. However, certain operations of the actuators 241-247 of each subsystem 211-217 may be controlled by a corresponding local controller 221-227, which may control the actuators 241-247 based on sensor data received from the sensors 231-237 of the corresponding subsystem 211-217 and/or based on control data received from the central controller 130.

The control system 200 may be a tiered control system, wherein control of the subsystems 211-217 of the offshore system 100 may be provided via a first tier of the local controllers 221-227 and a second tier of the central controller 130. The central controller 130 may facilitate control of one or more of the subsystems 211-217 at the level of each individual subsystem 211-217. For example, in the DFP system 215, sensor data may be fed into the local controller 225, which may respond to control the actuators 245. However, for control operations that involve multiple subsystems 211-217, the control may be coordinated through the central controller 130 operable to coordinate control of the equipment of two, three, four, or more (or each) of the subsystems 211-217. For example, coordinated control operations may include the control of downhole pressure during tripping. The downhole pressure may be affected by the DFC system 214 (e.g., pump rate) and the TH system 211 (e.g., tripping speed). Thus, when it is intended to maintain a certain downhole pressure during tripping, the central controller 130 may output control data to two or more of the participating subsystems 211-217.

As described above, the central controller 130 may control various operations of the subsystems 211-217 via analysis of the sensor data from one or more of the subsystems 211-217 to facilitate coordinated control between the subsystems 211-217. The central controller 130 may generate control data to coordinate operations of various equipment of the subsystems 211-217. The control data may include, for example, commands from rig personnel, such as turn on or turn off a pump, switch on or off a fluid valve, and update a physical property set-point, among other examples. The local controllers 221-227 may each include a fast control loop that directly obtains sensor data and executes, for example, a control algorithm to generate the control data. The central controller 130 may include a slow control loop to periodically obtain sensor data and generate the control data.

The central controller 130, the local controllers 221-227, and/or other electronic control devices of the control system 200 may each or collectively be operable to receive and store machine-readable and executable program code instructions (e.g., computer program code, algorithms, programmed processes or operations, etc.) on a memory device (e.g., a memory chip) and then execute the program code instructions to run, operate, or perform a control process for monitoring and/or controlling the equipment of the offshore system 100.

The central controller 130 may run (i.e., execute) a central control process 204 (e.g., a coordinated control process or other computer process) and each local controller 221-227 may run a corresponding local control process. Two or more of the local controllers 221-227 may run their local control processes to collectively coordinate operations between the equipment of two or more of the subsystems 211-217.

The control process 204 of the central controller 130 may operate as a mechanization manager of the control system 200, coordinating operational sequences of the equipment of the offshore system 100. The offshore system 100 may instead be operated manually by rig personnel (e.g., a driller) via the control workstations 126. The control workstations 126 may be utilized to monitor, configure, control, and/or otherwise operate one or more of the subsystems 211-217 by the rig personnel 125. The control workstations 126 may be communicatively connected with the central controller 130 and/or the local controllers 221-227 via the communication networks 202, 251-255 and may be operable to receive sensor data from the sensors 231-237 and transmit control data to the central controller 130 and/or the local controllers 221-227 to control the actuators 241-247. Accordingly, the control workstations 126 may be utilized by the rig personnel 125 to monitor and control the actuators 241-247 and other portions of the subsystems 211-217 via the central controller 130 and/or local controllers 221-227.

During manual operation, the rig personnel may operate as the mechanization manager of the control system 200 by manually coordinating operations of various equipment, such as to achieve an intended operational status (or drilling state) of the well construction operations, including tripping in or drilling at an intended rate of penetration (ROP). The control process of each local controller 221-227 may facilitate a lower (e.g., basic) level of control within the control system 200 to operate a corresponding piece of equipment or a plurality of pieces of equipment of a corresponding subsystem 211-217. Such control process may facilitate, for example, starting, stopping, and setting or maintaining an operating speed of a piece of equipment. During manual operation of the offshore system 100, the rig personnel 125 manually controls the individual pieces of equipment to achieve the intended operational status of each piece of equipment.

The control process 204 of the central controller 130 may output control data directly to the actuators 241-247 to control the well construction operations. The control process 204 may also or instead output control data to the local control process of one or more local controllers 221-227, wherein each local control process may then output control data to the actuators 241-247 of the corresponding subsystem 211-217 to control a portion of the well construction operations performed by that subsystem 211-217. Thus, the control processes of the central controller 130 and the local controllers 221-227 of the control system 200 individually and collectively perform monitoring and control operations described herein, including monitoring and controlling well construction operations. The program code instructions forming the basis for the control processes described herein may comprise rules (e.g., algorithms) based on the laws of physics for drilling and other well construction operations.

Each control process being run by the controllers 130, 221-227 of the control system 200 may receive and process (i.e., analyze) sensor data from the sensors 231-237 according to the program code instructions, and may generate control data (i.e., control signals or information) to operate or otherwise control the actuators 241-247 of the equipment. The controllers 130, 221-227 within the scope of the present disclosure can include, for example, programmable logic controllers (PLCs), industrial computers (IPCs), personal computers (PCs), soft PLCs, variable frequency drives (VFDs), and/or other controllers or processing devices operable to store and execute program code instructions, receive sensor data, and output control data to cause operation of the equipment based on the program code instructions, sensor data, and/or control data.

The present disclosure is further directed to systems and methods for communicating control data and sensor data at an offshore system between controllers (i.e., electronic control devices) located topside (i.e., above the sea surface) on an offshore rig and controllers of a stack assembly located subsea (i.e., below the sea surface). Such systems and methods may be implemented by control systems having an architecture (or configuration) comprising one or more ring communication networks (hereinafter "ring networks") communicatively connecting two or more controllers of the offshore system.

FIGS. 3-8 are schematic views of at least a portion of example implementations of control systems 300-310, respectively, facilitating monitoring and control of topside equipment and a subsea stack assembly by one or more topside and subsea controllers. The control systems 300-310 may comprise one or more features of the offshore system 100 shown in FIG. 1 and the control system 200 shown in FIG. 2. For example, each control system 300-310 may be or comprise an example implementation of at least a portion of the control system 200, including one or more of the communication networks 202, 251-257. Accordingly, the following description refers to FIGS. 1-8, collectively.

Each control system 300-310 may comprise a plurality of topside control workstations (i.e., HMI devices), topside equipment, a plurality of topside controllers (i.e., electronic control devices), subsea equipment (e.g., a stack assembly), and a plurality of subsea controllers. The topside controllers may be operable to control the topside equipment and/or the subsea equipment. The subsea controllers may be operable to control the topside equipment and/or the subsea equipment. Rig personnel may control the various topside and subsea equipment via the control workstations. The workstations and controllers of each control system 300-310 are communicatively connected via different communication network architecture comprising at least one ring network. The use of ring networks in each control system 300-310 provides redundant connections (or communication pathways) between the controllers. Such redundant connections improve reliability of the control systems 300-310 by permitting (or maintaining) communication between the controllers when one or more connections between the controllers becomes broken. The use of ring networks in each control system 300-310 may also minimize or otherwise reduce the quantity of interconnecting communication lines (e.g., conductors, cables, etc.) extending between the controllers. The ring network(s) may be located topside, subsea, and/or extend both topside and subsea. For clarity and ease of understanding, the ring network(s) shown in FIGS. 3-8 are indicated via solid lines and other networks or communication lines are indicated via dashed lines.

The topside components or equipment (hereafter collectively referred to as "equipment") communicatively connected via the ring network(s) may comprise a first controller 314 (e.g., a PLC) of a first control and communication panel 312, as well as a second controller 318 (e.g., a PLC) of a second control and communication panel 316. The controllers 314, 318 are each operable to monitor and control one or more topside and subsea equipment. The topside equipment may further comprise a remote communication device 320 (e.g., a PC) operable to facilitate communication between the equipment communicatively connected via the ring network(s) and other communication devices located at remote locations (e.g., another offshore rig, a land-based control center, etc.). The topside equipment may further comprise an event logger 321 (e.g., a PC) operable to record (or log) control data output by the topside and subsea equipment and sensor data indicative of operational status of various topside and subsea equipment during drilling and other operations.

The topside equipment may further comprise a controller 328 of a supervisor's control panel 324, a controller 334 of a driller's control panel 330, and a controller 340 of a toolpusher's control panel 336. Each control panel 324, 330, 336 may comprise a corresponding HMI 326, 332, 338 (e.g., a control workstation) manually operable by rig personnel to enter control commands to or receive information from a corresponding controller 328, 334, 340 and the controllers 314, 318. Each controller 328, 334, 340 may be implemented as a PLC to facilitate operation of the corresponding HMI 326, 332, 338. However, each controller 328, 334, 340 may instead be implemented as a remote input/output (I/O) interface module or a network switch or router to facilitate communicative connection with the controllers 314, 318. The topside equipment may further comprise a first unified network server 341 (e.g., a PC) and a second unified network server 342 (e.g., a PC) each operable to execute computer program code to run or otherwise facilitate operation of the HMIs 326, 332, 338. The unified network servers 341, 342 may facilitate communication between the control panels 324, 330, 336 and other equipment of the control systems 300-310. For example, the unified network servers 341, 342 may receive control commands manually entered to the HMIs 326, 332, 338 by rig personnel and output (e.g., code) control data to other topside (e.g., controllers 314, 318) and subsea controllers of the control systems 300-310 based on the received manually entered control commands.

The topside equipment may further comprise portions of the power fluid equipment 186, such as a controller 346 of a diverter control unit 344 operable to control one or more flow diverters (e.g., ram BOPs 168, fluid control valves 192, etc.) of the stack assembly 140 to thereby control the flow of wellbore fluid, process fluid, and/or other fluids though the stack assembly 140. The topside equipment of the power fluid equipment 186 may further comprise a controller 350 of a hydraulic pumping unit 348, a controller 354 of a fluid mixing unit 352, and a controller 358 of a fluid recovery unit 356. Each controller 346, 350, 354, 358 may be implemented as a PLC or a remote I/O interface module to facilitate communication with other topside controllers (e.g., controllers 314, 318) and subsea controllers.

The control systems 300-310 may further comprise subsea controllers of the stack assembly 140 communicatively connected to the topside controllers 314, 318 via the ring network(s) and/or other networks. The subsea controllers may comprise first and second controllers 362, 364 (e.g., PLCs) of a subsea electronics module 360 and a controller 368 of a riser control box 366. The subsea controllers may further comprise first and second controllers 372, 374 (e.g., PLCs) of a subsea electronics module 370 and a controller 378 of a riser control box 376. Each controller 368, 378 may be implemented as a PLC or a remote I/O interface module to facilitate communication with the topside controllers 314, 318 and the controllers 362, 364, 372, 374 of the communication and control panels 312, 316. The controllers 362, 364 of the subsea electronics module 360 and the controllers 372, 374 of a subsea electronics module 370 may be communicatively connected to and operable to control corresponding fluid control valves 192 and/or other actuators and, thus, facilitate control of the annular preventers 166 and the ram BOPs 168. The controllers 362, 364 of the subsea electronics module 360 and the controllers 372, 374 of a subsea electronics module 370 may also be communicatively connected to sensors of the annular preventers 166 and the ram BOPs 168 and, thus, facilitate monitoring of operational status and condition of the annular preventers 166 and the ram BOPs 168. The controllers 368, 378 of the riser control boxes 366, 376, respectively, may be communicatively connected to various sensors of the stack assembly 140 that are not associated with the annular preventers 166 and the ram BOPs 168 and, thus, facilitate monitoring of operational status and condition of various actuators of the stack assembly 140 that are not associated with the annular preventers 166 and the ram BOPs 168. The subsea electronics module 360 and the riser control box 366 may be located within the yellow pod of the stack assembly 140 and the subsea electronics module 370 and the riser control box 376 may be located within the blue pod of the stack assembly 140. The yellow and blue pods may be within or form a portion of an LMRP of the stack assembly 140 located above a lower stack assembly of the stack assembly 140.

Each of the topside controllers 314, 318 may be communicatively connected to the subsea equipment communicatively connected to the subsea controllers 362, 364, 368, 372, 374, 378 and, thus, may be operable to monitor and control such subsea equipment. Likewise, each of the subsea controllers 362, 364, 368, 372, 374, 378 may be communicatively connected to the topside equipment communicatively connected to the topside controllers 314, 318 and, thus, may be operable to monitor and control such topside equipment. Furthermore, the controllers 314, 318, 362, 364, 368, 372, 374, 378 may operate as each other's backup when one or more of the controllers 314, 318, 362, 364, 368, 372, 374, 378 become inoperative. Also, when one or more communication lines connecting the controllers 314, 318, 362, 364, 368, 372, 374, 378 become broken, the ring network(s) connecting the controllers 314, 318, 362, 364, 368, 372, 374, 378 may provide one or more alternate communication routes (i.e., communication lines) over which communicative connection between the controllers 314, 318, 362, 364, 368, 372, 374, 378 can be maintained.

Each of the first and second control and communication panels 312, 316 may operate as the other's backup, such that when one of the first and second controllers 314, 318 fails, the other of the first and second controllers 314, 318 can take over control of the topside and/or subsea equipment, thereby facilitating operation of such equipment without interruption. For example, when the first controller 314 fails, the second controller 318 may facilitate operation of topside equipment as well as operation of subsea equipment (e.g., the stack assembly 140). The first and second controllers 314, 318 may be communicatively connected by a synchronization (sync) connection line 319 operable to facilitate transmission of a sync signal indicative of operational status of the first and second controllers 314, 318. Thus, when one of the first and second controllers 314, 318 fails, the sync line 319 may indicate to the other of the first and second controllers 314, 318 to take over control of operations of the topside equipment and of the stack assembly 140. The connection line 319 does not for a portion of a ring communication network (e.g., the ring communication network 311), as the connection line 319 is operable to communicate the sync signal indicative of operational status of the first and second controllers, but not operable to communicate topside and subsea equipment control data and sensor data between the first and second controllers 314, 318.

Similarly to the first and second control and communication panels 312, 316, each of the first and second subsea electronics modules 360, 370 may operate as the other's backup, such that when the controllers 362, 364 fail, the controllers 372, 374 can take over control of the topside and/or subsea equipment, thereby facilitating operation of such equipment without interruption. For example, when the controllers 362, 364 fail, the controllers 372, 374 may facilitate operation of topside equipment and operation of the stack assembly 140. Furthermore, each of the first and second controllers 362, 364 and each of the first and second controllers 372, 374 may operate as the other's backup. For example, when one of the first and second controllers 362, 364 fails, the other of the first and second controllers 362, 364 can take over control of the topside and/or subsea equipment, thereby facilitating operation of such equipment without interruption.

Communication of control data and sensor data between the topside equipment may be facilitated via digital signals transmitted between such topside equipment over communication lines extending between such topside equipment. Similarly, communication between the subsea equipment may also be via digital signals transmitted between such subsea equipment over communication lines extending between such subsea equipment. Communication protocols used or otherwise implemented by one or more of the control systems 300-310 to facilitate communication between the topside equipment and between the subsea equipment may be, for example, TCP/IP or PROFINET. TCP/IP is a mature communication protocol and well supported by PLC programming technology. Other communication protocols based on TCP/IP, such as OPC UA and Modbus TCP may also or instead be used. PROFINET is a fast growing communication protocol widely adopted in automation industry to simplify hardware configuration and increase reliability. The control systems 300-310 may use or otherwise implement other communication protocols, such as, for example, 4-20 milliamp (mA) analog input, Modbus RTU, PROFIBUS, and CANopen.

Communication between the topside and subsea equipment, such as between the topside controllers 314, 318 and the subsea controllers 362, 364, 368, 372, 374, 378, may be facilitated via analog signals (e.g., digital subscriber line (DSL) signals) transmitted over communication lines 361, 371 extending between the topside equipment and the subsea equipment. Each communication line 361, 371 may be implemented by a separate cable (e.g., MUX cable) extending between the topside equipment and the subsea equipment. Digital to analog signal conversion may be performed by a topside modem 363, 373 (e.g., a DSL modem) installed at a topside end of each communication line 361, 371, respectively. Analog to digital signal conversion may be performed by a subsea modem 365, 375 (e.g., a DSL modem) installed at a subsea end of each communication line 361, 371, respectively. The modems 363, 365, 373, 375 may operate as communication nodes each operable to separate and direct communication signals to corresponding controllers 362, 364, 368, 372, 374, 378 or otherwise communicatively connect the topside controllers 314, 318 with the subsea controllers 362, 364, 368, 372, 374, 378.

The control system 300 may comprise a single ring communication network 311 located topside and communicatively connecting the topside equipment. The topside controller 314 of the control and communication panel 312 and the topside controller 318 of the control and communication panel 316 may be communicatively connected via the ring communication network 311, such that the topside controller 314 and the topside controller 318 may be communicatively connected along or form a portion of the ring communication network 311. The topside controller 314 may be communicatively connected with the subsea controllers 362, 364, 368 via the communication line 361 and distinct communication lines (e.g., a bus network) extending between the modem 365 (or another communication node) and a corresponding subsea controller 362, 364, 368. The topside controller 318 may be communicatively connected with the subsea controllers 372, 374, 378 via the communication line 371 and distinct communication lines (e.g., a bus network) extending between the modem 375 (or another communication node) and a corresponding subsea controller 372, 374, 378. Each modem 365, 375 may thus be communicatively connected directly with a corresponding subsea controller 362, 364, 368, 372, 374, 378.

Figure 3:
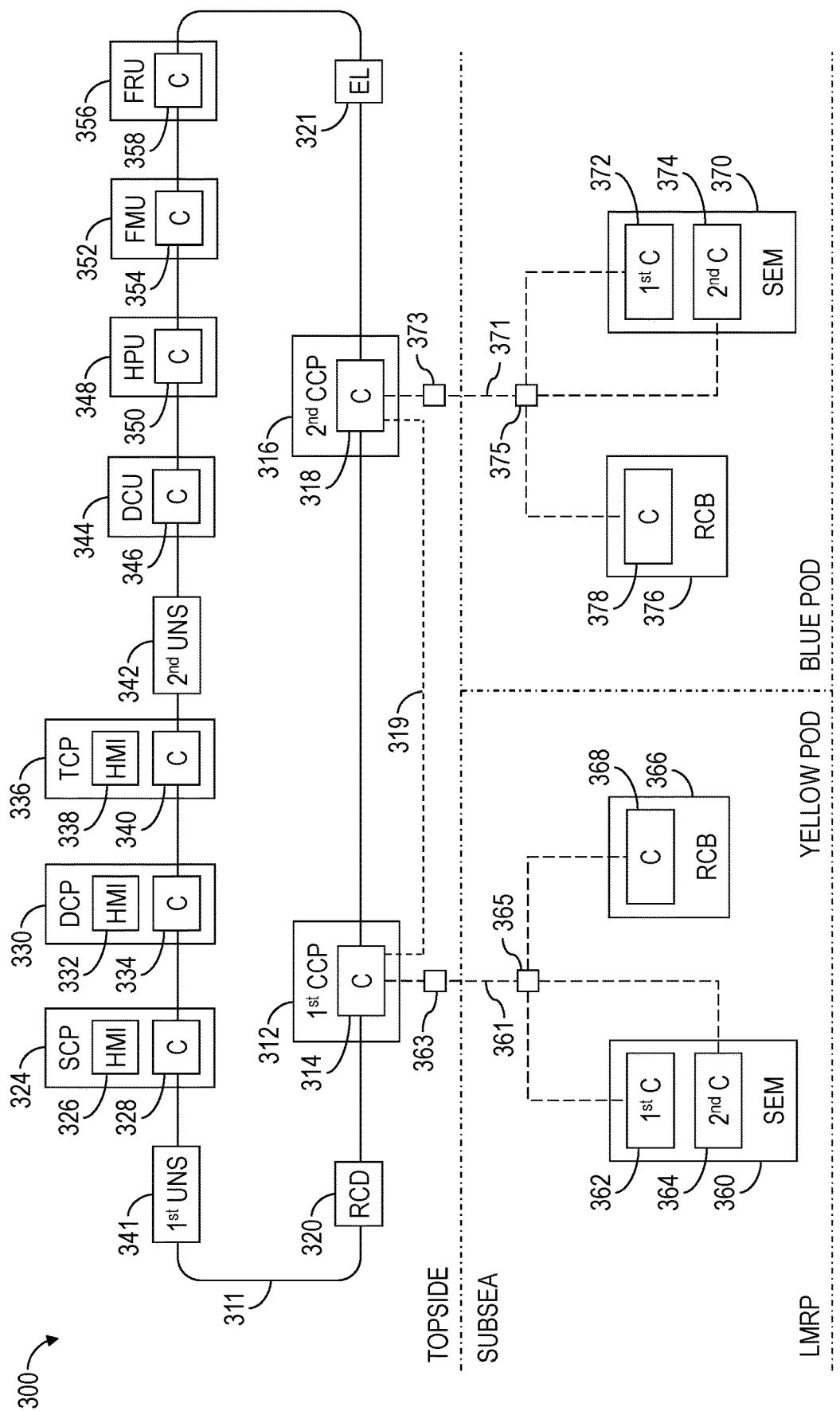
FIG. 3 is a schematic view of at least a portion of an example implementation of apparatus according to one or more aspects of the present disclosure.
Figure 4:
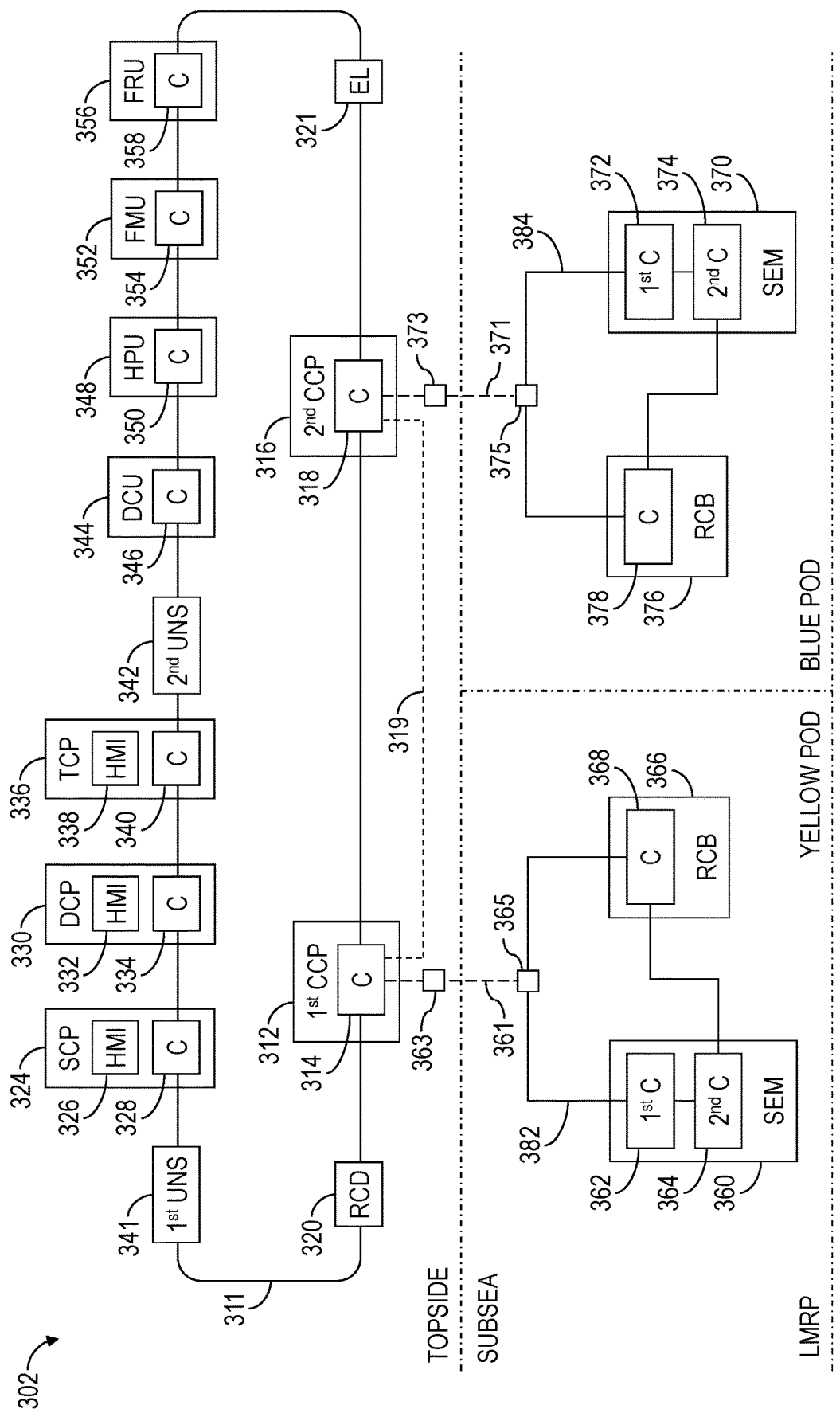
FIG. 4 is a schematic view of at least a portion of an example implementation of apparatus according to one or more aspects of the present disclosure.

The control system 302 shown in FIG. 4 comprises several features of the control system 300 shown in FIG. 3, including where indicated by like reference numerals. The control system 302 comprises a ring communication network 311 located topside and communicatively connecting the topside equipment. The control system 302 further comprises two ring communication networks 382, 384 located subsea. The subsea controllers 362, 364 of the subsea electronics module 360 and the subsea controller 368 of the riser control box 366 may be communicatively connected via the subsea ring communication network 382, such that the controllers 362, 364, 368 may be communicatively connected along or form a portion of the subsea ring communication network 382. The subsea controllers 372, 374 of the subsea electronics module 370 and the subsea controller 378 of the riser control box 376 may be communicatively connected via the subsea ring communication network 384, such that the controllers 372, 374, 378 may be communicatively connected along or form a portion of the subsea ring communication network 384. The ring communication networks 382, 384 may comprise the modems 365, 375. The modem 365 may be communicatively connected with the topside controller 314 and the subsea ring communication network 382 to thereby communicatively connect the topside controller 314 with the subsea controllers 362, 364, 368. Likewise, the modem 375 may be communicatively connected with the topside controller 318 and the subsea ring communication network 384 to thereby communicatively connect the topside controller 318 with the subsea controllers 372, 374, 378.

Figure 5:
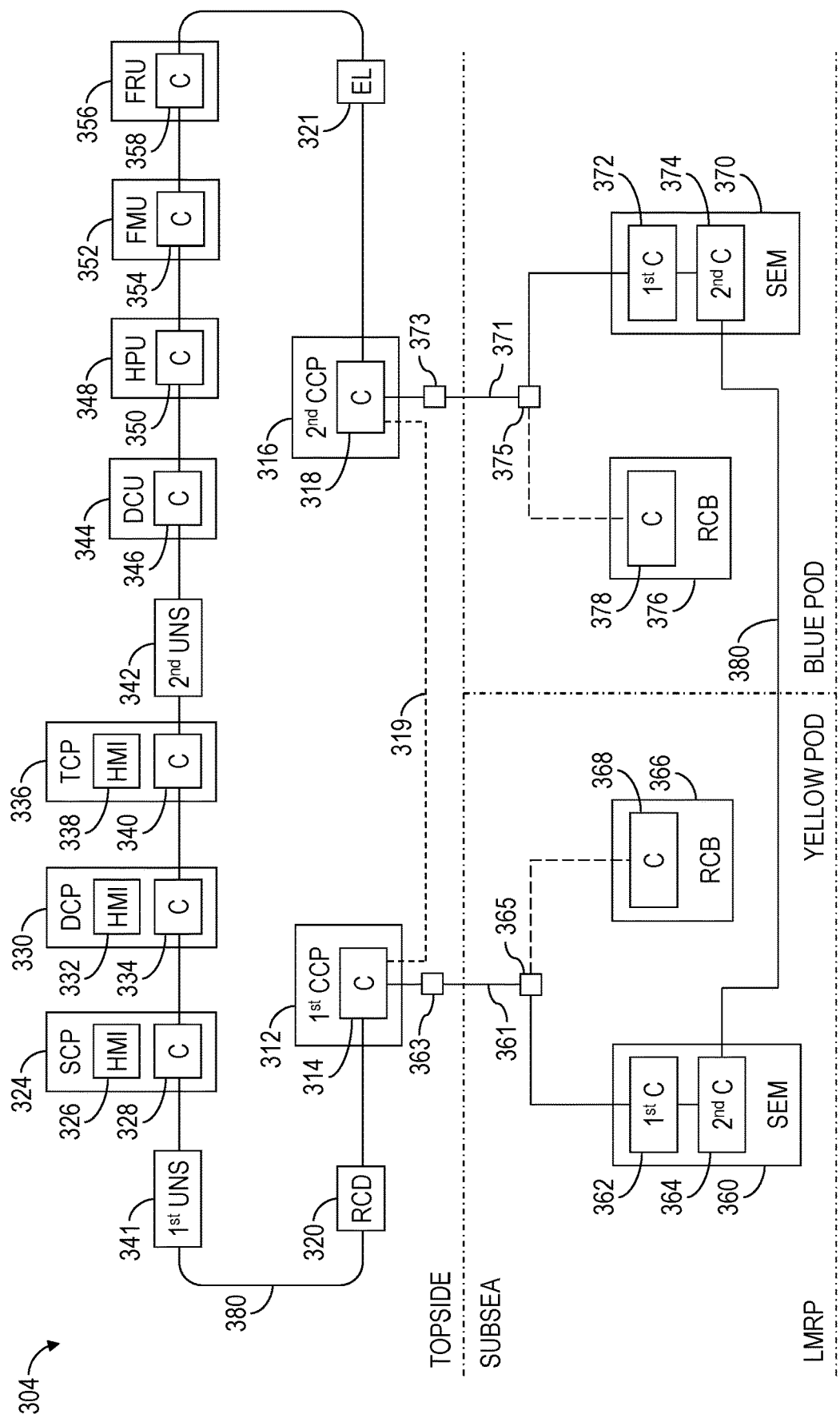
FIG. 5 is a schematic view of at least a portion of an example implementation of apparatus according to one or more aspects of the present disclosure.

The control system 304 shown in FIG. 5 comprises several features of the control systems 300, 302 shown in FIGS. 3 and 4, including where indicated by like reference numerals. The control system 304 comprises a single ring communication network 380 extending topside and subsea and communicatively connecting the topside and subsea equipment. The topside controller 314 of the control and communication panel 312, the topside controller 318 of the control and communication panel 316, the subsea controllers 362, 364 of the subsea electronics module 360, and the subsea controllers 372, 374 of the subsea electronics module 370 may be communicatively connected via the ring communication network 380, such that the controllers 314, 318, 362, 364, 372, 374 may be communicatively connected along or form a portion of the ring communication network 380. The topside controller 314 of the control and communication panel 312 and the topside controller 318 of the control and communication panel 316 may not be connected directly, but may be connected indirectly via a portion of the ring communication network 380 communicatively connecting or comprising the topside equipment 320, 321, 324, 330, 336, 341, 342, 344, 348, 352, 356. The ring communication network 380 may comprise the communication lines 361, 371 and the modems 363, 365, 373, 375. The subsea controller 364 of the subsea electronics module 360 may be communicatively connected directly with the subsea controller 374 of the subsea electronics module 370 via a distinct communication line. The modem 365 may be communicatively connected directly with the subsea controller 368 via a distinct communication line and the modem 375 may be communicatively connected directly with the subsea controller 378 via a distinct communication line.

Figure 6:
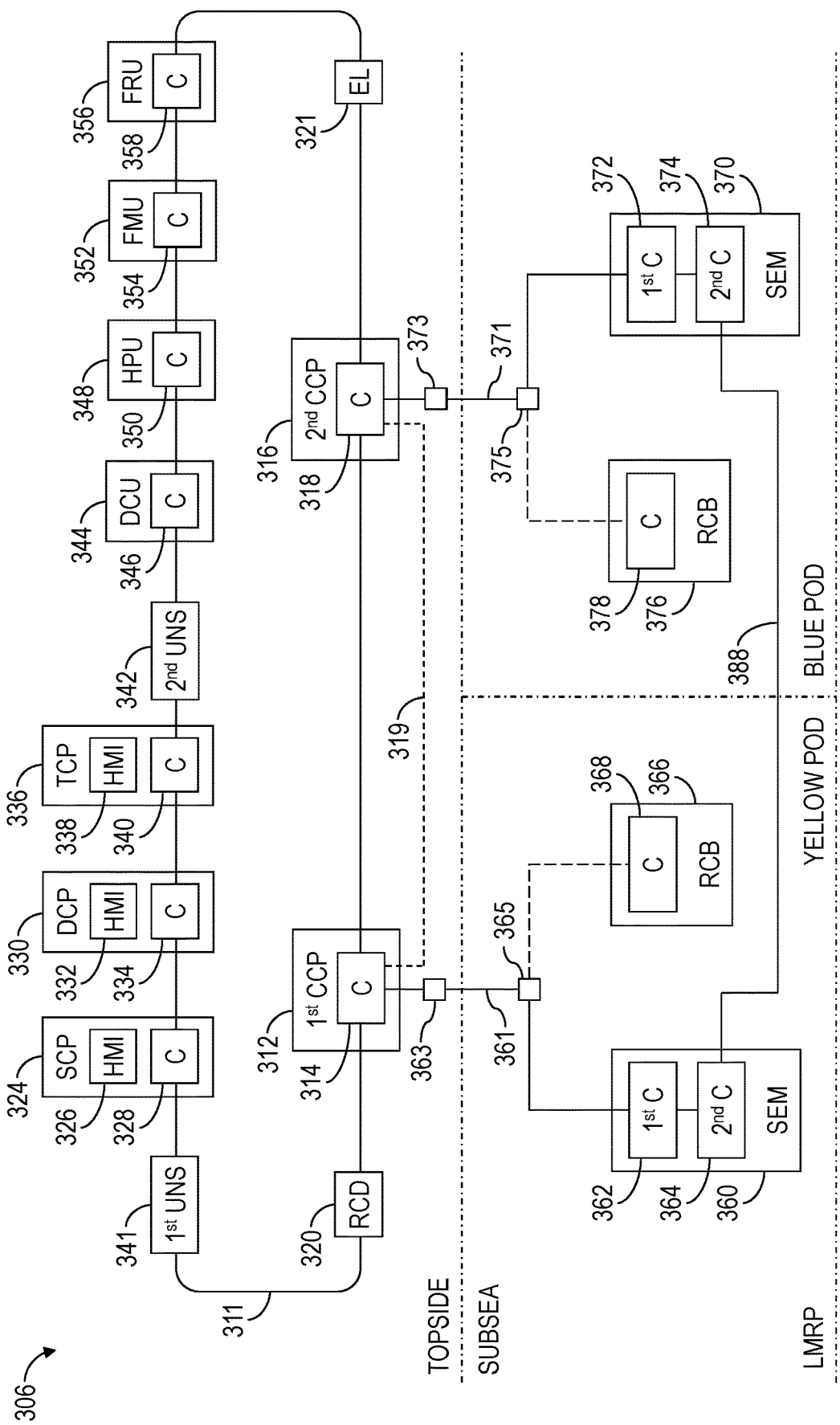
FIG. 6 is a schematic view of at least a portion of an example implementation of apparatus according to one or more aspects of the present disclosure.

The control system 306 shown in FIG. 6 comprises several features of the control systems 300, 302, 304 shown in FIGS. 3-5, including where indicated by like reference numerals. The control system 306 comprises a ring communication network 311 located topside and communicatively connecting the topside equipment. The control system 306 further comprises a ring communication network 388 extending topside and subsea. The topside controller 314 of the control and communication panel 312, the topside controller 318 of the control and communication panel 316, the subsea controllers 362, 364 of the subsea electronics module 360, and the subsea controllers 372, 374 of the subsea electronics module 370 may be communicatively connected via the ring communication network 388, such that the controllers 314, 318, 362, 364, 372, 374 may be communicatively connected along or form a portion of the ring communication network 388. The subsea controller 364 of the subsea electronics module 360 may be communicatively connected directly with the subsea controller 374 of the subsea electronics module 370 via a distinct communication line. The ring communication network 388 may not comprise the components or equipment of the ring communication network 311 other than the topside controllers 314, 318. The ring communication network 388 may comprise the communication lines 361, 371 and the modems 363, 365, 373, 375. The modem 365 may be communicatively connected directly with the subsea controller 368 via a distinct communication line and the modem 375 may be communicatively connected directly with the subsea controller 378 via a distinct communication line.

Figure 7:
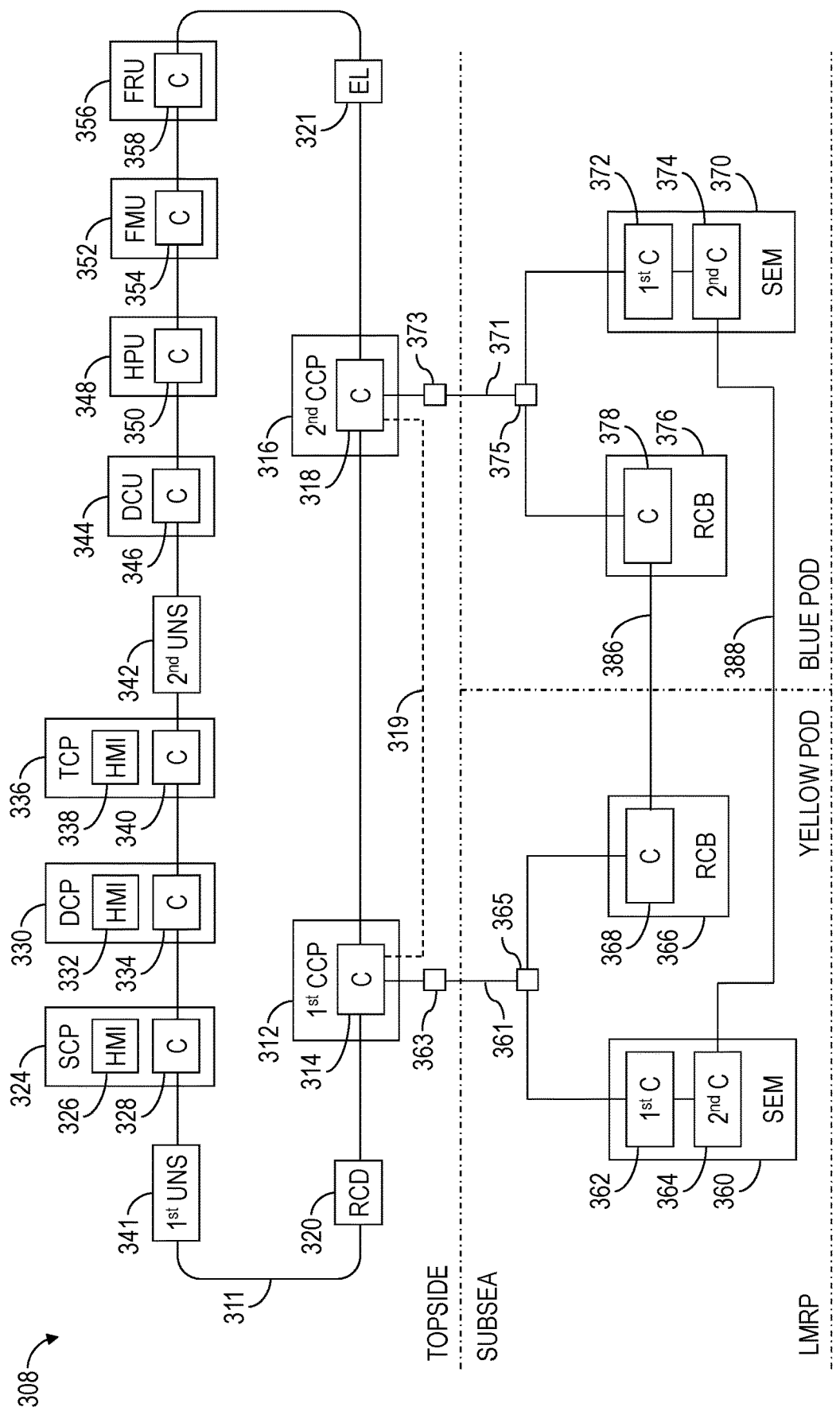
FIG. 7 is a schematic view of at least a portion of an example implementation of apparatus according to one or more aspects of the present disclosure.

The control system 308 shown in FIG. 7 comprises several features of the control system 300 shown in FIG. 3 and the control system 306 shown in FIG. 6, including where indicated by like reference numerals. The control system 308 comprises a ring communication network 311 located topside and communicatively connecting the topside equipment. The control system 308 further comprises a ring communication network 388 extending topside and subsea. The control system 308 further comprises a ring communication network 386 extending topside and subsea. The topside controller 314 of the control and communication panel 312, the topside controller 318 of the control and communication panel 316, the subsea controller 368 of the riser control box 366, and the subsea controller 378 of the riser control box 376 may be communicatively connected via the ring communication network 386, such that the controllers 314, 318, 368, 378 may be communicatively connected along or form a portion of the ring communication network 386. The subsea controller 368 of the riser control box 366 may be communicatively connected directly with the subsea controller 378 of the riser control box 376 via a distinct communication line. The ring communication network 386 may not comprise the components or equipment of the ring communication network 311 other than the topside controllers 314, 318. The ring communication network 386 may comprise the communication lines 361, 371 and the modems 363, 365, 373, 375.

Figure 8:
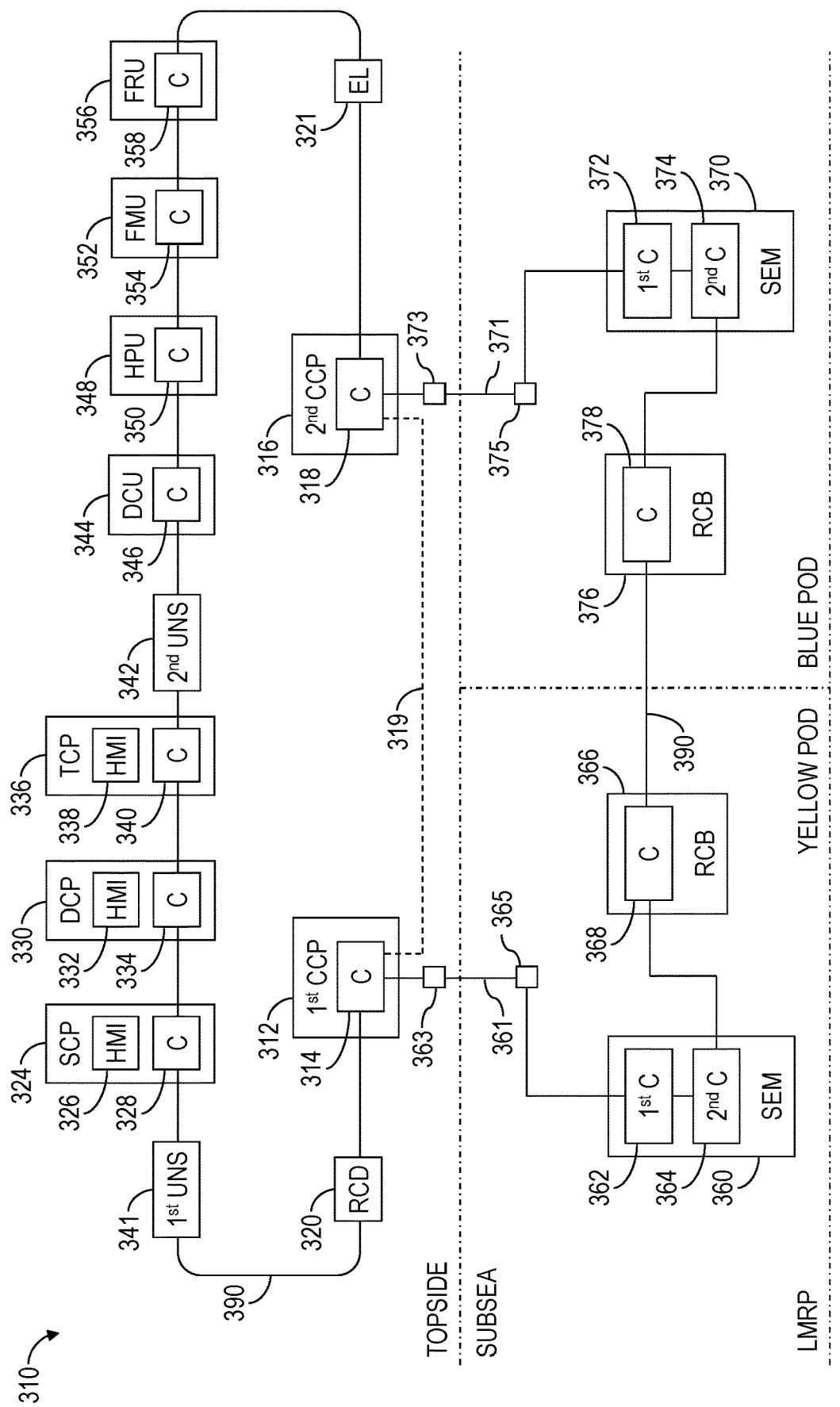
FIG. 8 is a schematic view of at least a portion of an example implementation of apparatus according to one or more aspects of the present disclosure.

The control system 310 shown in FIG. 8 comprises several features of the control systems 302, 304, 308 shown in FIGS. 4, 5, and 7, respectively, including where indicated by like reference numerals. The control system 310 comprises a single ring communication network 390 extending topside and subsea and communicatively connecting the topside and subsea equipment. The topside controller 314 of the control and communication panel 312, the topside controller 318 of the control and communication panel 316, the subsea controllers 362, 364 of the subsea electronics module 360, the subsea controllers 372, 374 of the subsea electronics module 370, the subsea controller 368 of the riser control box 366, and the subsea controller 378 of the riser control box 376 may be communicatively connected via the ring communication network 390, such that the controllers 314, 318, 362, 364, 368, 372, 374, 378 may be communicatively connected along or form a portion of the ring communication network 390. The topside controller 314 of the control and communication panel 312 and the topside controller 318 of the control and communication panel 316 may not be connected directly via a distinct communication line of the ring communication network 390, but may be connected indirectly via a portion of the ring communication network 390 communicatively connecting or comprising the topside equipment 320, 321, 324, 330, 336, 341, 342, 344, 348, 352, 356. The modem 365 may be communicatively connected directly with the subsea controller 362 of the subsea electronics module 360 via a distinct communication line and the modem 375 may be communicatively connected directly with the subsea controller 372 of the subsea electronics module 370 via a distinct communication line. The ring communication network 390 may comprise the communication lines 361, 371 and the modems 363, 365, 373, 375. The subsea controller 364 of the subsea electronics module 360 may be communicatively connected directly with the subsea controller 368 of the riser control box 366 via a distinct communication line, and the subsea controller 374 of the subsea electronics module 370 may be communicatively connected directly with the subsea controller 378 of the riser control box 376 via a distinct communication line. The subsea controller 368 of the riser control box 366 may be communicatively connected directly with the subsea controller 378 of the riser control box 376 via a distinct communication line.

Figure 9:
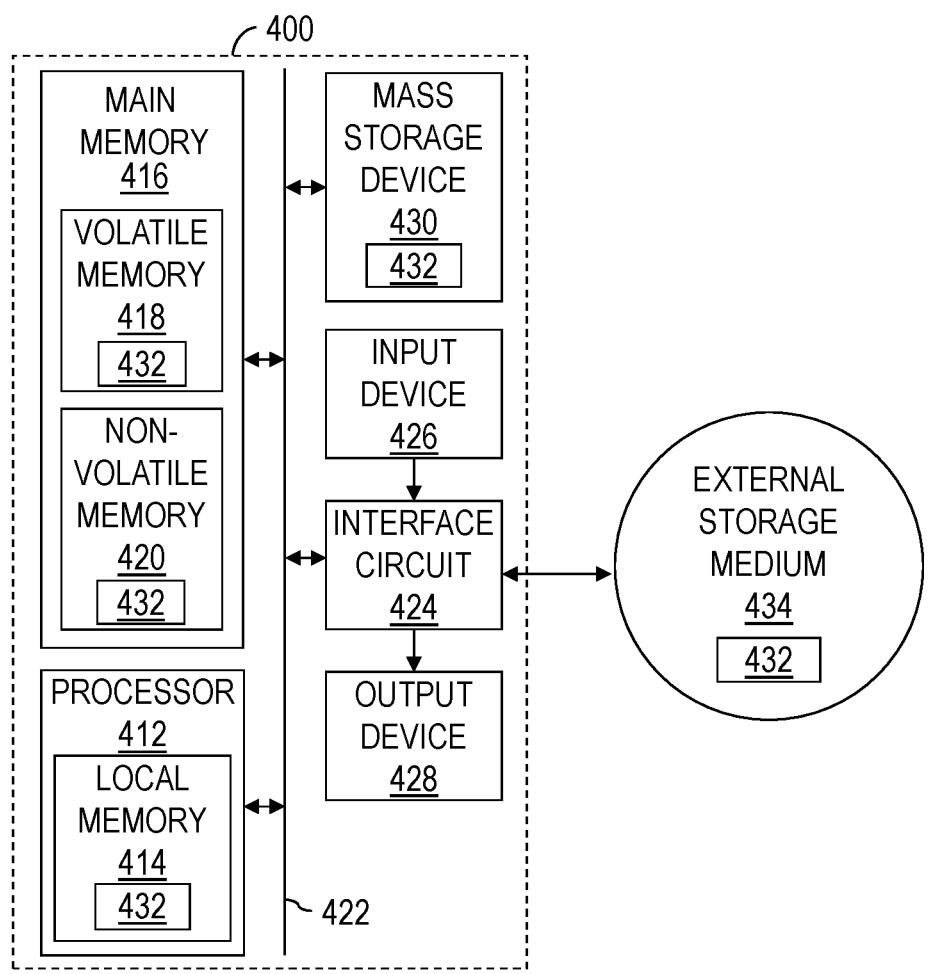
FIG. 9 is a schematic view of at least a portion of an example implementation of apparatus according to one or more aspects of the present disclosure.

FIG. 9 is a schematic view of at least a portion of an example implementation of a processing device 400 (or system) according to one or more aspects of the present disclosure. The processing device 400 may be or form at least a portion of one or more controllers and/or other equipment shown in one or more of FIGS. 1-8. Accordingly, the following description refers to FIGS. 1-9, collectively.

The processing device 400 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 400 may be or form at least a portion of the control systems 200, 300, 302, 304, 306, 308, 310 including the central controller 130, the local controllers 221-227, the control workstations 126, and the controllers 314, 318, 362, 364, 368, 372, 374, 378. Although it is possible that the entirety of the processing device 400 is implemented within one device, it is also contemplated that one or more components or functions of the processing device 400 may be implemented across multiple devices.

The processing device 400 may comprise a processor 412, such as a general-purpose programmable processor. The processor 412 may comprise a local memory 414 and may execute machine-readable and executable program code instructions 432 (i.e., computer program code) present in the local memory 414 and/or another memory device. The processor 412 may be, comprise, or be implemented by one or more processors of various types suitable to the local application environment, and may include one or more general-purpose computers, special-purpose computers, microprocessors, digital signal processors (DSPs), field-programmable gate arrays (FPGAs), application-specific integrated circuits (ASICs), and/or processors based on a multi-core processor architecture, as non-limiting examples. Examples of the processor 412 include one or more INTEL microprocessors, microcontrollers from the ARM and/or PICO families of microcontrollers, and embedded soft/hard processors in one or more FPGAs.

The processor 412 may execute, among other things, the program code instructions 432 and/or other instructions and/or programs to implement the example methods and/or operations described herein. For example, the program code instructions 432, when executed by the processor 412 of the processing device 400, may cause the processor 412 to receive and process (e.g., compare) sensor data (e.g., sensor measurements). The program code instructions 432, when executed by the processor 412 of the processing device 400, may also or instead output control data (i.e., control commands) to cause one or more pieces of equipment or equipment subsystems of an offshore system to perform the example methods and/or operations described herein.

The processor 412 may be in communication with a main memory 416, such as may include a volatile memory 418 and a non-volatile memory 420, perhaps via a bus 422 and/or other communication means. The volatile memory 418 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 420 may be, comprise, or be implemented by read-only memory, flash memory, and/or other types of memory devices. One or more memory controllers (not shown) may control access to the volatile memory 418 and/or the non-volatile memory 420.

The processing device 400 may also comprise an interface circuit 424, which is in communication with the processor 412, such as via the bus 422. The interface circuit 424 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 424 may comprise a graphics driver card. The interface circuit 424 may comprise a communication device, such as a modem or network interface card to facilitate exchange of data with external computing devices via a network (e.g., Ethernet connection, DSL, telephone line, coaxial cable, cellular telephone system, satellite, etc.).

The processing device 400 may be in communication with various sensors, video cameras, actuators, processing devices, controllers, and other devices via the interface circuit 424. The interface circuit 424 can facilitate communications between the processing device 400 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or other communication protocol.

One or more input devices 426 may also be connected to the interface circuit 424. The input devices 426 may permit rig personnel to enter the program code instructions 432, which may be or comprise control data, operational parameters, and/or operational set-points. The program code instructions 432 may further comprise modeling or predictive routines, equations, algorithms, processes, applications, and/or other programs operable to perform example methods and/or operations described herein. The input devices 426 may be, comprise, or be implemented by a keyboard, a mouse, a joystick, a touchscreen, a track-pad, a trackball, an isopoint, and/or a voice recognition system, among other examples. One or more output devices 428 may also be connected to the interface circuit 424. The output devices 428 may permit visualization or other sensory perception of various data, such as sensor data, status data, and/or other example data. The output devices 428 may be, comprise, or be implemented by video output devices (e.g., a liquid crystal display (LCD), a light-emitting diode (LED) display, a cathode ray tube (CRT) display, a touchscreen, etc.), printers, and/or speakers, among other examples. The one or more input devices 426 and the one or more output devices 428 connected to the interface circuit 424 may, at least in part, facilitate the HMIs described herein.

The processing device 400 may comprise a mass storage device 430 for storing data and program code instructions 432. The mass storage device 430 may be connected to the processor 412, such as via the bus 422. The mass storage device 430 may be or comprise a tangible, non-transitory storage medium, such as a hard disk drive, a compact disk (CD) drive, and/or digital versatile disk (DVD) drive, among other examples. The processing device 400 may be communicatively connected with an external storage medium 434 via the interface circuit 424. The external storage medium 434 may be or comprise a removable storage medium (e.g., a CD or DVD), such as may be operable to store data and program code instructions 432.

As described above, the program code instructions 432 may be stored in the mass storage device 430, the main memory 416, the local memory 414, and/or the removable storage medium 434. Thus, the processing device 400 may be implemented in accordance with hardware (perhaps implemented in one or more chips including an integrated circuit, such as an ASIC), or may be implemented as software or firmware for execution by the processor 412. In the case of firmware or software, the implementation may be provided as a computer program product including a non-transitory, computer-readable medium or storage structure embodying computer program code instructions 432 (i.e., software or firmware) thereon for execution by the processor 412. The program code instructions 432 may include program instructions or computer program code that, when executed by the processor 412, may perform and/or cause performance of example methods, processes, and/or operations described herein.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The invention claimed is:

1. An apparatus comprising:
a control system for controlling a subsea blowout preventer (BOP) of a subsea stack assembly installed over a subsea oil and gas well, wherein the control system comprises:
 a first topside control device and a second topside control device; and
 a first subsea control device and a second subsea control device; and
 a third subsea control device and a fourth subsea control device, wherein:
  the first topside control device, the second topside control device, the first subsea control device, and the second subsea control device are each communicatively connected with the BOP and operable to control operation of the BOP;
  the first subsea control device is a portion of a first control pod of the subsea stack assembly;
  the second subsea control device is a portion of a second control pod of the subsea stack assembly;
  the third subsea control device is a portion of the first control pod of the subsea stack assembly;
  the fourth subsea control device is a portion of the second control pod of the subsea stack assembly;
  the first topside control device is communicatively connected with the second topside control device via a first ring communication network, wherein the first ring communication network is at least partially located topside;
  the first topside control device, the second topside control device, the first subsea control device, and the second subsea control device are communicatively connected together via a second ring communication network that extends topside and subsea; and
  the first topside control device, the second topside control device, the third subsea control device, and the fourth subsea control device are communicatively connected together via a third ring communication network that extends topside and subsea.

2. The apparatus of claim 1 wherein the first subsea control device is communicatively connected directly with the second subsea control device.

3. The apparatus of claim 1 wherein:
the first subsea control device is communicatively connected directly with the second subsea control device; and
the third subsea control device is communicatively connected directly with the fourth subsea control device.

4. The apparatus of claim 1 wherein:
the first topside control device is communicatively connected with the first subsea control device via a first communication line;
the second topside control device is communicatively connected with the second subsea control device via a second communication line; and
the control system further comprises:
 a first communication device operable to transmit data over the first communication line between the first topside control device and the first subsea control device using a first analog signal; and
 a second communication device operable to transmit data over the second communication line between the second topside control device and the second subsea control device using a second analog signal.

5. An apparatus comprising:
a control system for controlling a subsea blowout preventer (BOP) of a subsea stack assembly installed over a subsea oil and gas well, wherein the control system comprises:
 a first topside control device and a second topside control device;
 a first subsea control device and a second subsea control device; and
 a third subsea control device and a fourth subsea control device, wherein:
  the first topside control device, the second topside control device, the first subsea control device, and the second subsea control device are each communicatively connected with the BOP and operable to control operation of the BOP;
  the first subsea control device is a portion of a first control pod of the subsea stack assembly;
  the second subsea control device is a portion of a second control pod of the subsea stack assembly;

the third subsea control device is a portion of the first control pod of the subsea stack assembly:

the fourth subsea control device is a portion of the second control pod of the subsea stack assembly;

the first topside control device is communicatively connected with the second topside control device via a first ring communication network located topside;

the first topside control device, the second topside control device, the first subsea control device, and the second subsea control device are communicatively connected together via a second ring communication network that extends topside and subsea; and the first topside control device, the second topside control device, the third subsea control device, and the fourth subsea control device are communicatively connected together via the second ring communication network.

6. The apparatus of claim 5 wherein the first subsea control device is communicatively connected directly with the second subsea control device.

7. An apparatus comprising:

a control system for controlling a subsea blowout preventer (BOP) of a subsea stack assembly installed over a subsea oil and gas well, wherein the control system comprises:

a first topside control device and a second topside control device; and a first subsea control device, a second subsea control device, a third subsea control device, and a fourth subsea control device, wherein:

the first topside control device, the second topside control device, the first subsea control device, the second subsea control device, the third subsea control device, and the fourth subsea control device are each communicatively connected with the BOP and operable to control operation of the BOP;

the first subsea control device and the third subsea control device are a portion of a first control pod of the subsea stack assembly;

the second subsea control device and the fourth subsea control device are a portion of a second control pod of the subsea stack assembly;

the first topside control device is communicatively connected with the second topside control device via a first ring communication network located topside;

the first topside control device, the second topside control device, the first subsea control device, and the second subsea control device are communicatively connected together via a second ring communication network that extends topside and subsea; and the first topside control device, the second topside control device, the third subsea control device, and the fourth subsea control device are communicatively connected together via a third ring communication network that extends topside and subsea.

8. The apparatus of claim 7 wherein:

the first subsea control device is communicatively connected directly with the second subsea control device; and the third subsea control device is communicatively connected directly with the fourth subsea control device.

9. The apparatus of claim 7 wherein:

the control system further comprises:

a fifth subsea control device of the first control pod; and a sixth subsea control device of the second control pod; and the first topside control device, the second topside control device, the first subsea control device, the second subsea control device, the fifth subsea control device, and the sixth subsea control device are communicatively connected together via the second ring communication network.

10. The apparatus of claim 9 wherein:

the third subsea control device is communicatively connected directly with the fourth subsea control device; and the fifth subsea control device is communicatively connected directly with the sixth subsea control device.

* * * * *